(12) United States Patent
Lee et al.

(10) Patent No.: US 11,327,709 B2
(45) Date of Patent: May 10, 2022

(54) ELECTRONIC DEVICE, AUDIO-PURPOSE EXTERNAL ELECTRONIC DEVICE, AND METHOD OF RECEIVING SIGNAL BY ELECTRONIC DEVICE CONNECTED WITH AUDIO-PURPOSE EXTERNAL ELECTRONIC DEVICE

(71) Applicant: SAMSUNG ELECTRONICS CO., LTD., Suwon-si (KR)

(72) Inventors: Chungik Lee, Suwon-si (KR); Wonpyo Park, Suwon-si (KR); Byongwoo Jeong, Suwon-si (KR); Jungmin Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/839,613

(22) Filed: Apr. 3, 2020

(65) Prior Publication Data

US 2020/0333998 A1 Oct. 22, 2020

(30) Foreign Application Priority Data

Apr. 17, 2019 (KR) .................. 10-2019-0045012

(51) Int. Cl.
*G06F 3/16* (2006.01)
*G06F 13/42* (2006.01)
*H04H 20/44* (2008.01)

(52) U.S. Cl.
CPC .......... *G06F 3/162* (2013.01); *G06F 13/4282* (2013.01); *H04H 20/44* (2013.01); *G06F 2213/0042* (2013.01)

(58) Field of Classification Search
CPC ......... G06F 13/4282; G06F 2213/0042; G06F 3/162; H04H 20/44
(Continued)

(56) References Cited

U.S. PATENT DOCUMENTS 8,229,513 B2 * 7/2012 Ibe .......................... H04R 5/04
455/569.1
10,734,011 B2 * 8/2020 Gether ................... H04R 5/027
(Continued)

FOREIGN PATENT DOCUMENTS

CN 107728991 A 2/2018
KR 10-2016-0141426 12/2016
(Continued)

OTHER PUBLICATIONS

International Search Report and Written Opinion dated Jul. 10, 2020 in counterpart International Application No. PCT/KR2020/004509.

*Primary Examiner* — Tan H Trinh
(74) *Attorney, Agent, or Firm* — Nixon & Vanderhye P.C.

(57) ABSTRACT

According to an embodiment, an electronic device comprises a connector and a communication circuit configured to receive a frequency modulation (FM) and/or a digital multimedia broadcasting (DMB), wherein at least two ground pins for antenna signal reception among a plurality of ground pins included in the connector are set as pins positioned to contact at least one antenna pin included in a connector of an audio-purpose external electronic device based on the connector of the electronic device being connected with the connector of the audio-purpose external electronic device including an audio codec.

15 Claims, 7 Drawing Sheets

(58) Field of Classification Search
USPC ........ 455/557, 573, 569.1; 370/338; 381/74, 381/77; 700/94
See application file for complete search history.

(56) References Cited

U.S. PATENT DOCUMENTS

| | | | | |
|---|---|---|---|---|
| 2003/0152056 A1* | 8/2003 | Lee | ...................... | H04W 28/14 |
| | | | | 370/338 |
| 2005/0261024 A1* | 11/2005 | Jin | ...................... | H04M 1/0245 |
| | | | | 455/557 |
| 2006/0178171 A1* | 8/2006 | Liu | ......................... | H02J 7/00 |
| | | | | 455/573 |
| 2007/0098184 A1* | 5/2007 | Ibe | ......................... | H04R 5/04 |
| | | | | 381/77 |
| 2008/0208376 A1* | 8/2008 | Jung | ..................... | G06F 1/3215 |
| | | | | 700/94 |
| 2009/0307511 A1* | 12/2009 | Fiennes | ................ | G06F 1/3215 |
| | | | | 713/323 |
| 2012/0159036 A1 | 6/2012 | Kim | | |
| 2014/0211958 A1* | 7/2014 | Zhang | ................. | H04R 1/1041 |
| | | | | 381/74 |
| 2014/0376736 A1* | 12/2014 | Liu | ...................... | H04R 1/1041 |
| | | | | 381/74 |
| 2015/0222981 A1* | 8/2015 | Pegg | ...................... | H04M 1/05 |
| | | | | 381/74 |
| 2015/0326261 A1* | 11/2015 | Paik | ..................... | H04B 1/1027 |
| | | | | 455/234.2 |
| 2016/0085405 A1* | 3/2016 | Lee | ..................... | G06F 3/04817 |
| | | | | 345/173 |
| 2016/0088149 A1* | 3/2016 | Kim | .................. | H04M 3/42102 |
| | | | | 455/415 |
| 2016/0098119 A1* | 4/2016 | Chang | ..................... | G06F 3/165 |
| | | | | 700/94 |
| 2016/0275031 A1* | 9/2016 | Lee | ........................ | G06F 13/20 |
| 2016/0364360 A1* | 12/2016 | Lim | ...................... | H03M 1/12 |
| 2017/0047640 A1* | 2/2017 | Choi | ..................... | H01Q 1/243 |
| 2017/0127203 A1* | 5/2017 | Ryu | ......................... | H04R 5/04 |
| 2018/0018934 A1* | 1/2018 | Lim | .................. | H01R 13/6683 |
| 2018/0143927 A1* | 5/2018 | Kim | ..................... | G06F 13/385 |
| 2018/0181509 A1* | 6/2018 | Jo | ......................... | G01N 27/06 |
| 2018/0349296 A1* | 12/2018 | Rand | ..................... | G06F 13/385 |
| 2019/0058617 A1* | 2/2019 | Kolsrud | ................ | G06F 13/382 |
| 2019/0097365 A1* | 3/2019 | Lee | ......................... | H04B 1/18 |
| 2019/0110119 A1* | 4/2019 | Yoshino | .................. | H04B 1/18 |
| 2019/0286593 A1* | 9/2019 | Li | ......................... | H04R 1/1033 |
| 2020/0280152 A1* | 9/2020 | Jeong | ................... | H01Q 1/2258 |

FOREIGN PATENT DOCUMENTS

KR  10-2017-019733  2/2017
KR  10-2019-0036300  4/2019

* cited by examiner

| Pin | Name | Description |
|---|---|---|
| A1 | GND | Ground return |
| A2 | SSTXp1 | SuperSpeed differential pair #1, TX, positive |
| A3 | SSTXn1 | SuperSpeed differential pair #1, TX, negative |
| A4 | $V_{BUS}$ | Bus power |
| A5 | CC1 | Configuration channel |
| A6 | Dp1 | USB 2.0 differential pair, position 1, positive |
| A7 | Dn1 | USB 2.0 differential pair, position 1, negative |
| A8 | SBU1 | Sideband use (SBU) |
| A9 | $V_{BUS}$ | Bus power |
| A10 | SSRXn2 | SuperSpeed differential pair #4, RX, negative |
| A11 | SSRXp2 | SuperSpeed differential pair #4, RX, positive |
| A12 | GND | Ground return |

| Pin | Name | Description |
|---|---|---|
| B12 | GND | Ground return |
| B11 | SSRXp1 | SuperSpeed differential pair #2, RX, positive |
| B10 | SSRXn1 | SuperSpeed differential pair #2, RX, negative |
| B9 | $V_{BUS}$ | Bus power |
| B8 | SBU2 | Sideband use (SBU) |
| B7 | Dn2 | USB 2.0 differential pair, position 2, negative[a] |
| B6 | Dp2 | USB 2.0 differential pair, position 2, positive[a] |
| B5 | CC2 | Configuration channel |
| B4 | $V_{BUS}$ | Bus power |
| B3 | SSTXn2 | SuperSpeed differential pair #3, TX, negative |
| B2 | SSTXp2 | SuperSpeed differential pair #3, TX, positive |
| B1 | GND | Ground return |

ELECTRONIC DEVICE, AUDIO-PURPOSE EXTERNAL ELECTRONIC DEVICE, AND METHOD OF RECEIVING SIGNAL BY ELECTRONIC DEVICE CONNECTED WITH AUDIO-PURPOSE EXTERNAL ELECTRONIC DEVICE

CROSS-REFERENCE TO RELATED APPLICATION

This application is based on and claims priority under 35 U.S.C. § 119 to Korean Patent Application No. 10-2019-0045012, filed on Apr. 17, 2019, in the Korean Intellectual Property Office, the disclosure of which is incorporated by reference herein in its entirety.

BACKGROUND

Field

The disclosure relates to an electronic device capable of receiving antenna signals using an audio-purpose external electronic device, the audio-purpose external electronic device, and a method of receiving antenna signals by the electronic device connected with the audio-purpose external electronic device.

Description of Related Art

An electronic device includes an earjack (e.g., 3.5 phi) for plugging in an analog earphone. Audio signals may be output to the earphone plugged into the earjack of the electronic device, or antenna signals may be received from the earphone through an antenna signal line included in the earphone.

Recent electronic devices have included a USB type-C receptacle. An earphone with a USB type-C plug may be connected through the USB type-C receptacle to the electronic device to receive audio signals. With a USB type-C plug, an external electronic device for charging may be connected through the USB type-C receptacle to the electronic device to receive power.

USB type-C plug-packed earphones lack antenna functionality. Thus, although such an earphone connects to an electronic device, applications requiring antenna signals, such as radio applications or DMB applications, cannot be used.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device capable of receiving antenna signals from an audio-purpose external electronic device with a USB type-C plug, an audio-purpose external electronic device, and a method of receiving antenna signals by an electronic device connected with an audio-purpose external electronic device.

In accordance with various example embodiments, an electronic device comprises: a connector and a communication circuit configured to receive a frequency modulation (FM) and/or a digital multimedia broadcasting (DMB), wherein at least two ground pins among a plurality of ground pins included in the connector are set as pins positioned to contact at least one antenna pin included in a connector of an audio-purpose external electronic device based on the connector of the electronic device being connected with the connector of the audio-purpose external electronic device including an audio codec.

In accordance with various example embodiments, an audio-purpose external electronic device comprises: a connector, an audio signal unit including an audio codec, and an antenna unit including an antenna pad connected to an antenna signal line, wherein at least one ground pin among a plurality of ground pins included in the connector is connected with the antenna pad of the antenna unit to configure the at least one ground pin as an antenna pin.

In accordance with various example embodiments, a method of receiving an antenna signal by an electronic device comprises: based on an audio-purpose external electronic device being connected to a connector of the electronic device, and an application corresponding to the audio-purpose external electronic device running, activating a communication circuit configured to receive a frequency modulation (FM) and/or a digital multimedia broadcasting (DMB) included in the electronic device to connect at least two ground pins among a plurality of ground pins included in the connector to the communication circuit, and receiving the antenna signal from the audio-purpose external electronic device via at least one ground pin among the at least two ground pins.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Throughout the drawings, like reference numerals will be understood to refer to like parts, components, and structures.

DETAILED DESCRIPTION

Figure 1:
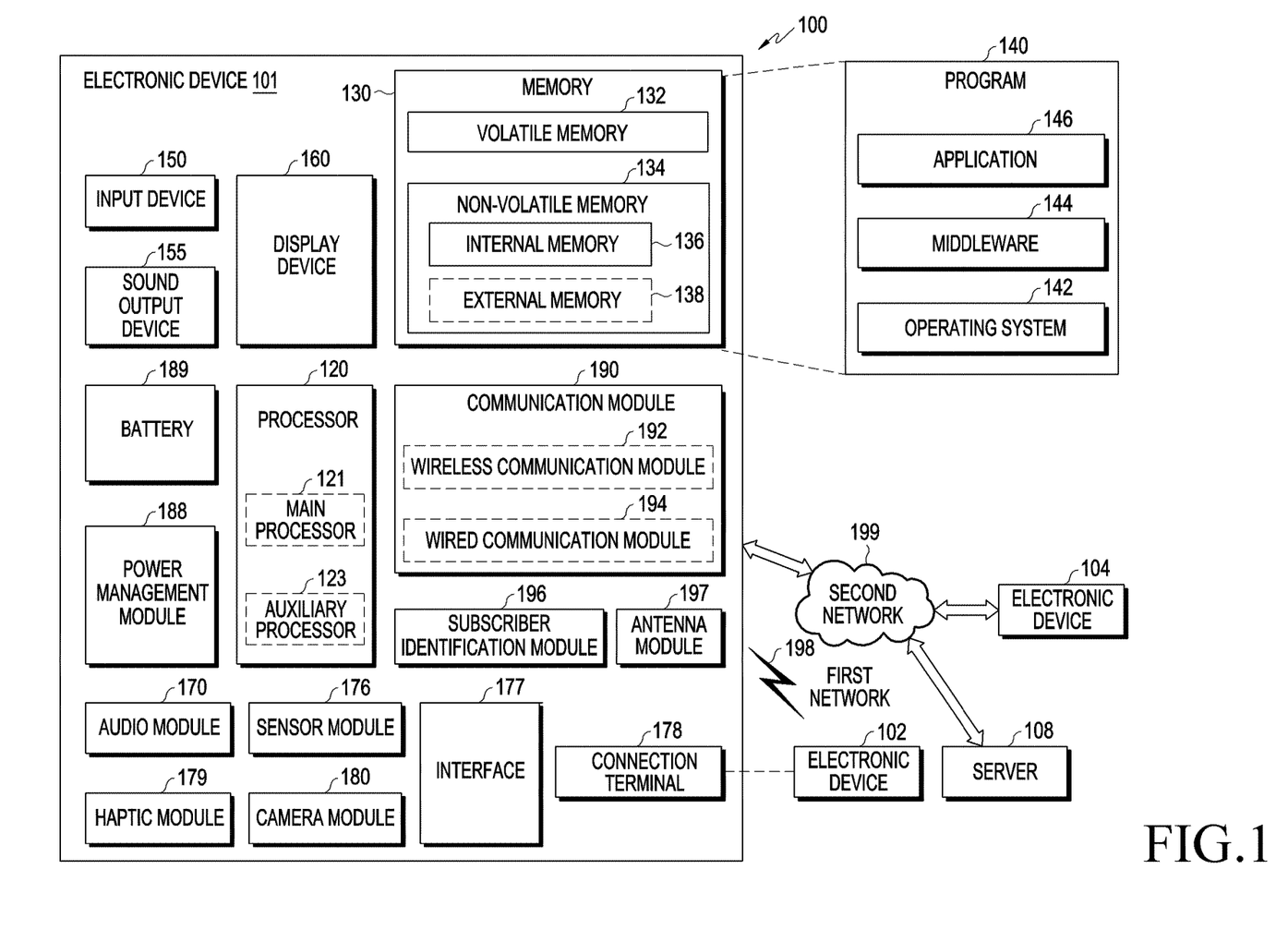
FIG. 1 is a diagram illustrating an example electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
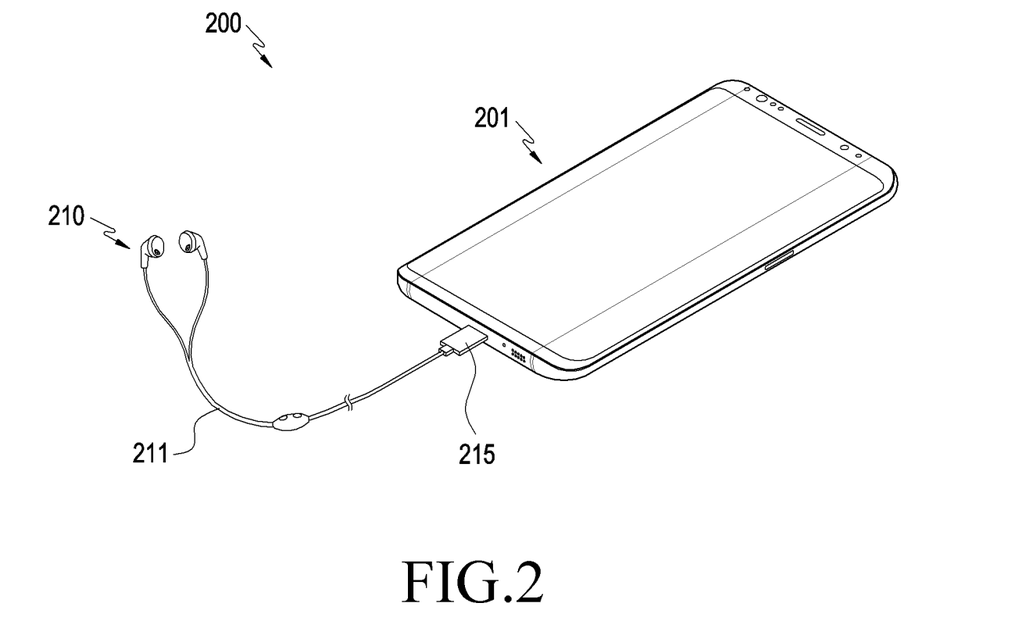
FIG. 2 is a diagram illustrating an example electronic device and an example audio-purpose external electronic device according to an embodiment.

FIG. 2 is a diagram 200 illustrating an example electronic device and an example audio-purpose external electronic device according to an embodiment.

Referring to FIG. 2, according to an embodiment, an electronic device 201 (e.g., the electronic device 101 of FIG. 1) may include a connector (e.g., a receptacle) for connection of an external electronic device (e.g., an audio-purpose external electronic device or a charging-purpose external electronic device). According to an embodiment, the electronic device 201 may use at least two ground pins of a plurality of ground (GND) pins included in the connector of the electronic device as antenna pins or, as originally intended, ground pins depending on the kind of the external electronic device connected to the connector of the electronic device.

According to an embodiment, upon determining that the external electronic device connected to the connector of the electronic device is an audio-purpose external electronic device (e.g., an earphone antenna), the electronic device 201 may use at least two of the plurality of ground (GND) pins included in the connector of the electronic device as antenna pins. The connector of the electronic device may include a USB type-C receptacle.

According to an embodiment, an audio-purpose external electronic device 210 may include a main body unit 211 and a connecting unit 215. According to an embodiment, a cable of the main body unit 211 may include a microphone signal line, two audio signal lines (for L signals and R signals), an antenna signal line, and a ground signal line. According to an embodiment, the connecting unit 215 may include a connector (e.g., a plug), an audio signal unit for processing audio signals, and an antenna unit for antenna functionality. The connecting unit 215 is described in greater detail below with reference to FIGS. 3 and 4. The connector of the audio-purpose external electronic device may include a USB type-C plug.

According to an embodiment, if the audio-purpose external electronic device 210 connects to the electronic device 201 (e.g., the electronic device 101 of FIG. 1), at least one of at least two ground pins, which may be used as antenna pins, among the plurality of ground pins included in the connector (e.g., a receptacle) of the electronic device 201 contacts the antenna pin of the connector (e.g., a plug) of the audio-purpose external electronic device 210, and the electronic device 201 may receive antenna signals from the audio-purpose external electronic device 210.

Figure 3:
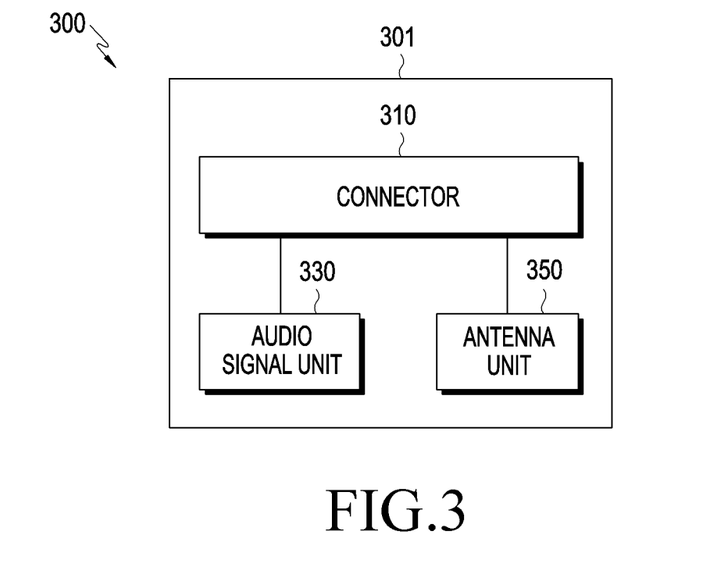
FIG. 3 is a block diagram illustrating an example configuration of an example connecting unit of an audio-purpose external electronic device according to an embodiment.

FIG. 3 is a block diagram 300 illustrating an example configuration of an example connecting unit of an audio-purpose external electronic device according to an embodiment.

Referring to FIG. 3, a connecting unit 301 (e.g., the connecting unit 215 of FIG. 2) of an audio-purpose external electronic device (e.g., the audio-purpose external electronic device 210 of FIG. 2) may include a connector 310, an audio signal unit (e.g., including an audio codec) 330, and an antenna unit (e.g., including an antenna pad) 350.

According to an embodiment, the connector 310 may include a plurality of pins, and at least one of a plurality of ground (GND) pins among the plurality of pins may be set and used as an antenna pin.

According to an embodiment, one of a plurality of power supply pins (e.g., a VBUS pin) included in the connector 310 may be used to supply power to the audio signal unit 330, preventing and/or reducing application of power noise from the audio signal unit 330 to the antenna unit 350.

According to an embodiment, among a plurality of USB signal transmission/reception pins (e.g., two D+ pins and two D− pins) included in the connector 310, two USB signal transmission/reception pins (e.g., one D+ pin and one D− pin) may be used to transmit/receive USB signals between the audio signal unit 330 and an electronic device (e.g., the electronic device 101 of FIG. 1 or the electronic device 201 of FIG. 2) connected with the audio-purpose external electronic device (e.g., the audio-purpose external electronic device 210 of FIG. 2), thereby preventing and/or reducing application of USB noise, which may be caused upon transmission/reception of USB signals, from the audio signal unit 330 to the antenna unit 350.

According to an embodiment, the audio signal unit 330 may include a plurality of signal pads connected with a plurality of signal lines and a codec.

According to an embodiment, the codec may convert audio analog signals, which are received from the electronic device (e.g., the electronic device 101 of FIG. 1 or the electronic device 201 of FIG. 2) connected with the audio-purpose external electronic device (e.g., the audio-purpose external electronic device of FIG. 2), into digital signals or convert audio digital signals to analog signals.

According to an embodiment, the codec may receive power via one of the plurality of power supply pins (e.g., the VBUS pin) included in the connector 310.

According to an embodiment, the codec may use, among a plurality of USB signal transmission/reception pins (e.g., two D+ pins and two D− pins) included in the connector 310, two USB signal transmission/reception pins (e.g., one D+ pin and one D− pin) to transmit/receive USB signals to/from an electronic device (e.g., the electronic device 101 of FIG. 1 or the electronic device 201 of FIG. 2) connected with the audio-purpose external electronic device (e.g., the audio-purpose external electronic device of FIG. 2). According to an embodiment, the plurality of signal pads may be individually connected to the microphone signal line, two audio signal lines (e.g., the L signal line or R signal line), and ground signal line included in the cable of the main body unit (e.g., the main body unit 211 of FIG. 2) of the audio-purpose external electronic device (e.g., the audio-purpose external electronic device 210 of FIG. 2).

According to an embodiment, the antenna unit 350 may include an antenna pad connected with the antenna signal line among the plurality of signal lines included in the cable of the main body unit of the audio-purpose external electronic device (e.g., the audio-purpose external electronic device 210 of FIG. 2), and the antenna pad may be connected with at least one ground pin, which is set as an antenna pin, among the plurality of ground pins of the connector 310.

Figure 4:
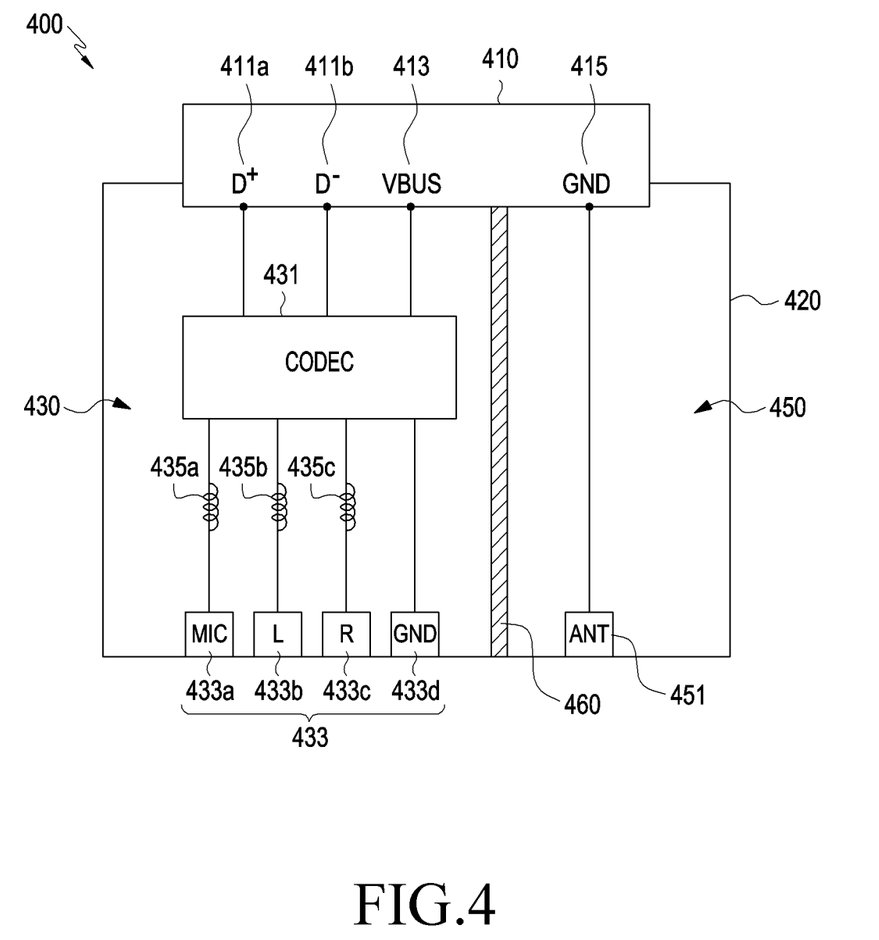
FIG. 4 is a diagram illustrating an example configuration of an example connecting unit of an audio-purpose external electronic device according to an embodiment.

FIG. 4 is a diagram 400 illustrating an example configuration of a connecting unit of an audio-purpose external electronic device according to an embodiment.

Referring to FIG. 4, a connecting unit (e.g., the connecting unit 215 of FIG. 2 or the connecting unit 301 of FIG. 3) of an audio-purpose external electronic device (e.g., the audio-purpose external electronic device 210 of FIG. 2) may include a connector 410 (e.g., the connector 310 of FIG. 3), an audio signal unit 430 (e.g., the audio signal unit 330 of FIG. 3), and an antenna unit 450 (e.g., the antenna unit 350 of FIG. 3).

According to an embodiment, the connector 410 may include a plurality of pins, and at least one 415 of a plurality of ground (GND) pins (not shown) for functioning as ground, among the plurality of pins may be set as an antenna pin.

According to an embodiment, the connector 410 may include a USB type-C plug. At least one ground pin 415 of the plurality of ground pins positioned outermost in the connector 410, which may minimize and/or reduce noise interference due to transmission/reception of USB signals or power supply, among the plurality of pins included in the USB type-C plug, may be set as an antenna pin.

According to an embodiment, one 413 of the plurality of VBUS pins (not shown) included in the connector 410 may be used to supply power to the audio codec 431 of the audio signal unit 430, one 411a of the plurality of D+ pins (not shown) and one 411b of the plurality of D− pins (not shown) included in the connector 410 may be used to transmit/receive USB signals, thereby preventing noise generated from the audio signal unit 430 from being applied to the antenna unit 450.

According to an embodiment, the audio signal unit 430 (e.g., the audio signal unit 330 of FIG. 3) may include a codec 431 for converting audio signals and a plurality of signal pads 433 connected with a plurality of signal lines. According to an embodiment, the codec 431 may be connected to one 413 of the plurality of VBUS pins (not shown) included in the connector 410 to receive power.

According to an embodiment, the codec 431 may be connected to one 411a of the plurality of D+ pins (not shown) and one 411b of the plurality of D− pins (not shown) included in the connector 410, transmitting/receiving USB signals.

According to an embodiment, the codec 431 may be connected with the plurality of signal pads 433. According to an embodiment, the plurality of signal pads 433 may include, for example, a microphone pad (MIC) 433a, two audio signal pads (L) 433b and (R) 433c, and a ground pad 433d connected with the microphone signal line, two audio signal lines (e.g., L signal or R signal), and ground signal line, respectively, included in the cable of the main body unit (e.g., the main body unit 211 of FIG. 2) of the audio-purpose external electronic device (e.g., the audio-purpose external electronic device 210 of FIG. 2).

According to an embodiment, beads 435a, 435b, and 435c may be individually added to the lines connecting the codec 431 to the microphone pad (MIC) 433a and the two audio signal pads (L) 433b and (R) 433c among the plurality of signal pads 433, removing and/or reducing noise that may be caused from the microphone pad (MIC) 433a and the two audio signal pads (L) 433b and (R) 433c.

According to an embodiment, the antenna 450 (e.g., the antenna unit 430 of FIG. 3) may include an antenna pad 451 connected with the antenna signal line included in the cable of the main body unit (e.g., the main body unit 211 of FIG. 2) of the audio-purpose external electronic device (e.g., the audio-purpose external electronic device 210 of FIG. 2).

According to an embodiment, the antenna pad 451 may be connected with at least one ground pin 415 set as antenna pin among the plurality of ground (GND) pins included in the connector 410.

Figure 5:
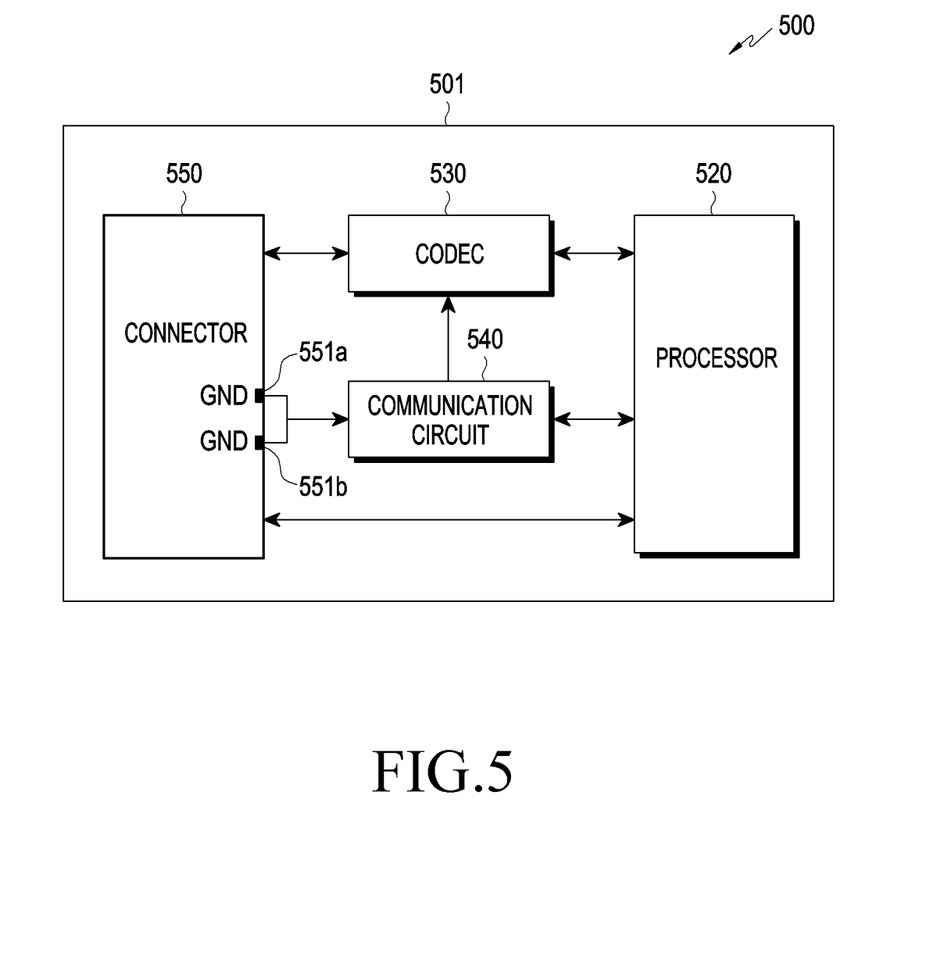
FIG. 5 is a block diagram illustrating an example configuration of an example connecting unit of an electronic device according to an embodiment.

According to an embodiment, the audio signal unit 430 and the antenna unit 450 may be included on a printed circuit board 420 configured of a plurality of conductive layers, and some conductive layer 460 between the audio signal unit 430 and the antenna unit 450 may be removed to separate the audio signal unit 430 from the antenna unit 450. Separation of the audio signal unit 430 and the antenna unit 450 from each other may prevent application of noise from the audio signal unit 430 to the antenna unit 450. FIG. 5 is a block diagram 500 illustrating an example configuration of an example electronic device according to an embodiment.

Referring to FIG. 5, an electronic device 501 (e.g., the electronic device 101 of FIG. 1 or the electronic device 201 of FIG. 2) may include a processor (e.g., including processing circuitry) 520 (e.g., the processor 120 of FIG. 1), a codec 530, a communication circuit configured to receive a frequency modulation (FM) and/or a digital multimedia broadcasting (DMB) 540, and a connector 550.

According to an embodiment, upon determining that an audio-purpose external electronic device (e.g., the audio-purpose external electronic device 210 of FIG. 2) connects to the connector 550, the processor 520 may perform control to use at least two of a plurality of ground (GND) pins included in the connector 550 as pins for receiving antenna signals. According to an embodiment, the processor 520 may include various processing circuitry and determines whether an external electronic device connects to the connector 550 and, upon determining that an external electronic device connects to the connector 550, the processor 520 may determine the kind of the external electronic device. Upon determining that the external electronic device connected to the connector 550 is an audio-purpose external electronic device (e.g., the audio-purpose external electronic device 210 of FIG. 2), the processor 520 may determine to execute an application corresponding to the audio-purpose external electronic device. Upon determining to execute the application corresponding to the audio-purpose external electronic device, the processor 520 may activate the communication circuit 540 and connect at least two of the plurality of ground (GND) pins included in the connector 550 to the communication circuit 540 so that the two ground pins are used as pins for receiving antenna signals. For example, upon receiving a resistance indicating the audio-purpose external electronic device via an identification pin (e.g., a CC pin) included in the connector 550, the processor 520 may determine that the external electronic device connected with the connector 550 is the audio-purpose external electronic device.

According to an embodiment, upon determining that the external electronic device connected to the connector 550 is another kind of external electronic device, e.g., a charging-purpose external electronic device, the plurality of ground (GND) pins included in the connector 550 may be used for grounding purposes as originally intended because the charging-purpose external electronic device supplies direct current (DC) frequency power. For example, upon receiving a voltage through the power supply pin (e.g., the VBUS pin) included in the connector 550 or a resistance indicating the charging-purpose external electronic device through the identification pin (e.g., the CC pin), the processor 520 may determine that the external electronic device connected to the connector 550 is the audio-purpose external electronic device. According to an embodiment, the processor 520 may control the codec 530 to convert the audio signal and transmit the converted audio signal to the audio-purpose external electronic device (e.g., the audio-purpose external electronic device 210 of FIG. 2) connected with the connector 550.

According to an embodiment, the processor 520 may receive the signal, which is received from the audio-purpose external electronic device (e.g., the audio-purpose external electronic device 210 of FIG. 2) connected with the connector 550 through the antenna, using the communication circuit 540.

According to an embodiment, the codec 530 may convert audio analog signals into digital signals or audio digital signals into analog signals and may transmit the converted audio signal to the audio-purpose external electronic device (e.g., the audio-purpose external electronic device 210 of FIG. 2) connected with the connector 550.

According to an embodiment, the communication circuit 540 may receive the signal (e.g., a frequency modulation (FM) signal), which is received from the audio-purpose external electronic device (e.g., the audio-purpose external electronic device 210 of FIG. 2) connected with the connector 550 through the antenna.

According to an embodiment, the communication circuit 540 may be connected with at least two ground pins 551a and 551b among the plurality of ground (GND) pins included in the connector 550 and may receive the signal received through the antenna from at least one ground pin 551a or 551b, contacting at least one antenna pin of the connector of the audio-purpose external electronic device (e.g., the audio-purpose external electronic device 210 of FIG. 2), among the at least two ground pins 551a and 551b.

According to an embodiment, the connector 550 may include a plurality of ground (GND) pins. If the audio-purpose external electronic device (e.g., the audio-purpose external electronic device 210 of FIG. 2) connects to the connector 550, at least two ground pins 551a and 551b among the plurality of ground (GND) pins may be used as antenna pins for receiving antenna signals.

According to an embodiment, at least two ground pins 551a and 551b among the plurality of ground (GND) pins included in the connector 550 may be connected to the ground GND of the electronic device 501 via inductors, and the at least two ground pins 551a and 551b may be used as antenna pins and pins connected with the ground GND of the electronic device 501. For example, in the DC frequency band, the impedance of the inductors is low, so that the ground pins 551a and 551b may be electrically connected with the ground GND of the electronic device 501 and, in the FM or DMB frequency band, the impedance of the inductors is high, so that they may be electrically connected to the communication circuit 540.

According to an embodiment, the processor 520 may selectively connect at least two ground pins among the plurality of ground (GND) pins included in the connector 550 to the communication circuit 540 or the ground GND of the electronic device using a switch (not shown) included in the electronic device.

According to an embodiment, at least two ground pins 551a and 551b among the plurality of ground (GND) pins are connected to the communication circuit 540.

According to an embodiment, if an external electronic device (e.g., a charging-purpose external electronic device) other than the audio-purpose external electronic device connects to the connector 550, the plurality of ground (GND) pins may function as grounds as originally intended because the other external electronic device (e.g., a charging-purpose external electronic device) supplies DC frequency-band power.

According to an embodiment, at least two ground pins 551a and 551b for receiving antenna signals among the plurality of ground (GND) pins included in the connector 550 may be set as pins positioned to be able to contact at least one antenna pin (e.g., the ground pin 415 of FIG. 3) included in the connector of an audio-purpose external electronic device (e.g., the audio-purpose external electronic device 210 of FIG. 2) when the connector 550 of the electronic device 501 connects with the audio-purpose external electronic device (e.g., the audio-purpose external electronic device 210 of FIG. 2).

According to an embodiment, the connector 550 may include a USB type-C receptacle. The structure of the connector is described in greater detail below with reference to FIGS. 6A and 6B.

Figure 6A:
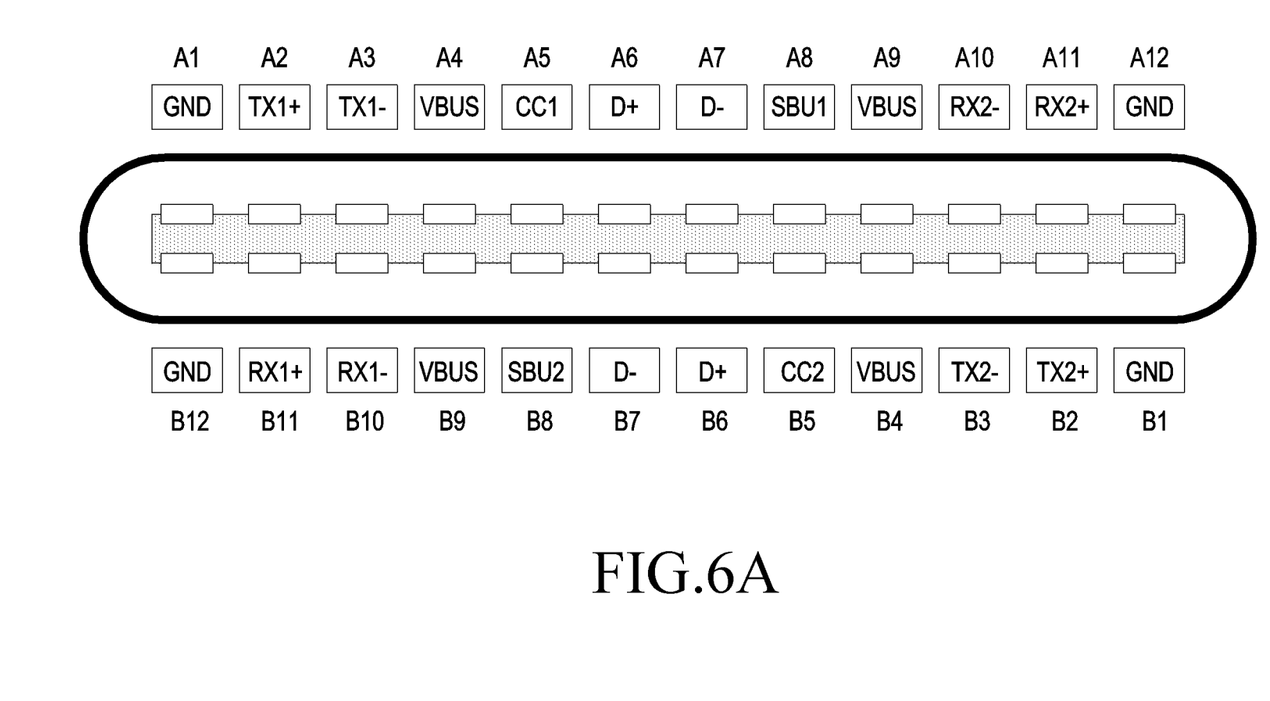
FIGS. 6A and 6B are diagrams illustrating an example connector structure of an electronic device according to an embodiment.
Figure 6B:
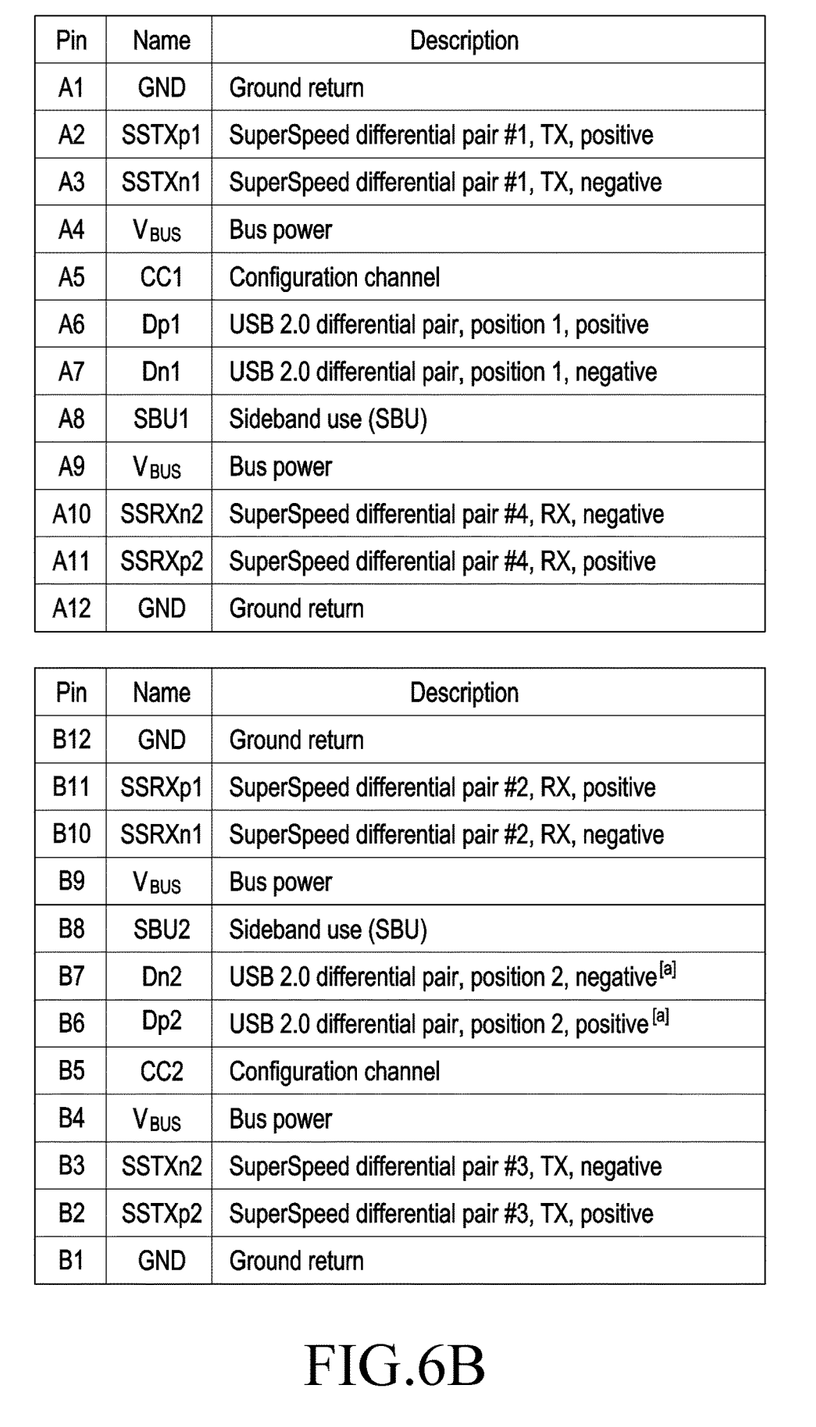

FIGS. 6A and 6B are diagrams illustrating an example connector structure of an example electronic device according to an embodiment. FIGS. 6A and 6B illustrate the structure of a USB type-C connector.

Referring to FIGS. 6A and 6B, the connector 550 may include GND pins A1, A12, B1, and B12, TX+/TX− pins A2, A3, B2, and B3, VBUS pins A4, A9, B4, and B9, CC pins A5 and B5, D+/D− pins A6, A7, B6, and B7, SBU pins A8 and B8, and RX+/RX− pins A10, A11, B10, and B11.

The TX+/TX− pins A2, A3, B2, and B3 are pins for a SuperSpeed data bus capable of quick transmission, the VBUS pins A4, A9, B4, and B9 are pins for USB cable power charging, and the CC pins A5 and B5 are identification pins. The D+/D− pins A6, A7, B6, and B7 are pins for different, bi-lateral USB signals, the SBU pins A8 and B8 are extra pins available for various purposes (such as for audio signals or display signals), and the RX+/RX− pins A10, A11, B10, and B11 are pins for a SuperSpeed data bus capable of quick reception.

According to an embodiment, in the structure of the USB type-C connector 550, at least two GND pins among the plurality of GND pins A1, A12, B1, and B12 positioned outermost in the arrangement of the pins may be used as pins for receiving antenna signals, thereby minimizing and/or reducing noise interference. If the electronic device does not support SuperSpeed, the TX+/TX− pins A2, A3, B2, and B3 and the RX+/RX− pins A10, A11, B10, and B11 are not used. Thus, at least two GND pins among the plurality of GND pins A1, A12, B1, and B12 disposed relatively far away (e.g., at least two pins apart from) the D+/D− pins A6, A7, B6, and B7 for bi-lateral USB signals and/or the VBUS pins A4, A9, B4, and B9 are used as pins for receiving antenna signals, thereby minimizing noise interference.

According to an embodiment, at least two GND pins among the plurality of GND pins A1, A12, B1, and B12 may be connected through inductors to the GND pins of the electronic device (e.g., the electronic device 501 of FIG. 5), so that the at least two GND pins may be used as a GND pin as originally intended and an antenna pin.

According to an embodiment, as the USB type-C connector (e.g., the connector 310 of FIG. 3 or the connector 401 of FIG. 4) of the audio-purpose external electronic device (e.g., the audio-purpose external electronic device 210 of FIG. 2) may be inserted and connected to the connector 550 of the electronic device (e.g., the electronic device 201 of FIG. 2 or the electronic device 501 of FIG. 5) regardless of the direction of insertion, a pair of GND pins, one at the top and the other at the bottom in the connector 550, among the plurality of GND pins A1, A12, B1, and B12, may be used as pins for receiving antenna signals. For example, among the plurality of GND pins A1, A12, B1, and B12, the A1 GND pin and the B1 GND pin, or the A12 GND pin and the B12 GND pin, may be used as pins for receiving antenna signals.

According to an example embodiment, an electronic device (e.g., the electronic device 101 of FIG. 1, the electronic device 201 of FIG. 2, or the electronic device 501 of FIG. 5) comprises a connector (e.g., the connector 550 of FIG. 5) and a communication circuit configured to receive a frequency modulation (FM) and/or a digital multimedia broadcasting (DMB) (e.g., the communication circuit 540 of FIG. 5), wherein at least two ground pins (e.g., A1 and B1 or A12 and B12 of FIGS. 6A and 6B) among a plurality of ground pins (e.g., A1, A12, B1, and B12 of FIGS. 6A and 6B) included in the connector are set as pins positioned to contact at least one antenna pin (e.g., the ground pin 415 of FIG. 4) included in a connector of an audio-purpose external electronic device when the connector of the electronic device connects with the connector of the audio-purpose external electronic device (e.g., the audio-purpose external electronic device 210 of FIG. 2) including an audio codec (e.g., the codec 431 of FIG. 4).

According to an example embodiment, the at least two ground pins among the plurality of ground pins positioned outermost in the connector may be configured to be used as pins for antenna signal reception.

According to an example embodiment, the at least two ground pins among the plurality of ground pins disposed at least two pins apart from a plurality of signal transmission/reception pins (A6, A7, B6, and B7) and/or a plurality of power supply pins (e.g., A4, A9, B4, and B9 of FIGS. 6A and 6B) among the plurality of pins included in the connector may be configured to be used as pins for antenna signal reception.

According to an example embodiment, the at least two ground pins among the plurality of ground pins may be configured to include at least one ground pin among a plurality of ground pins arranged at a top and at least one ground pin among a plurality of ground pins arranged at a bottom, among the plurality of pins of the connector.

According to an example embodiment, the at least two ground pins among the plurality of ground pins may be connected with a ground pin of the electronic device via an inductor to allow the at least two ground pins to be used as pins for antenna signal reception and pins for grounding.

According to an example embodiment, the electronic device may further comprise a processor (e.g., the processor 120 of FIG. 1 or the processor 520 of FIG. 5). When the audio-purpose external electronic device connects to the connector, and an application corresponding to the audio-purpose external electronic device runs, the processor may be configured to activate the communication circuit to connect the at least two ground pins (e.g., A1 and B1 or A12 and B12 of FIGS. 6A and 6B) among the plurality of ground pins (e.g., the plurality of ground pins A1, A12, B1, and B12 of FIGS. 6A and 6B) included in the connector to the communication circuit and to receive an antenna signal from the audio-purpose external electronic device via at least one ground pin among the at least two ground pins.

According to an example embodiment, the processor may be configured to determine whether an external electronic device connects to the connector, when the external electronic device connects to the connector, determine a kind of the external electronic device, and when the kind of the external electronic device is the audio-purpose external electronic device, determine that the at least two ground pins are pins for antenna signal reception.

According to an example embodiment, unless the kind of the external electronic device is the audio-purpose external electronic device, the processor may be configured to use the plurality of ground pins for grounding.

According to an example embodiment, the connector may include a USB type-C receptacle.

According to an example embodiment, an audio-purpose external electronic device (e.g., the audio-purpose external electronic device 210 of FIG. 2) comprises a connector (e.g., the connector 310 of FIG. 3 or the connector 410 of FIG. 4), an audio signal unit (e.g., the audio signal unit 330 of FIG. 3 or the audio signal unit 430 of FIG. 4) including an audio codec, and an antenna unit (e.g., the antenna unit 350 of FIG. 3 or the antenna unit 450 of FIG. 4) including an antenna pad connected with an antenna signal line, wherein at least one ground pin (e.g., the ground pin 415 of FIG. 4) among a plurality of ground pins included in the connector is connected with the antenna pad (e.g., the antenna pad 451 of FIG. 4) of the antenna unit to allow the at least one ground pin to be used as an antenna pin.

According to an example embodiment, the audio codec of the audio signal unit may be connected with one of a plurality of power supply pins included in the connector to receive power.

According to an example embodiment, the audio codec of the audio signal unit may be connected with two of a plurality of signal transmission/reception pins included in the connector to transmit/receive data.

According to an example embodiment, the audio signal unit may be separated from a conductive area of the antenna unit. According to an embodiment, the antenna signal line may be configured to be included in a cable of the audio-purpose external electronic device.

According to an example embodiment, the connector may include a USB type-C plug.

Figure 7:
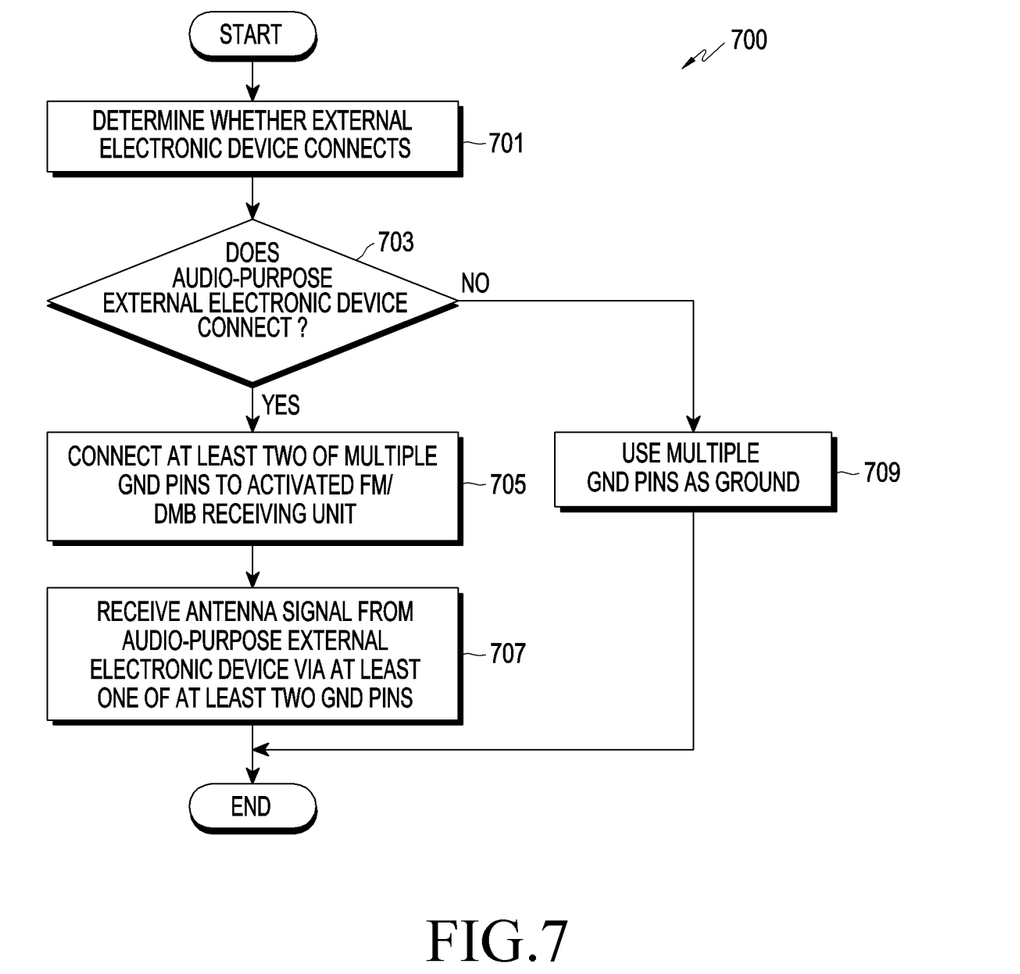
FIG. 7 is a flowchart illustrating example operations for receiving an antenna signal by an electronic device according to an embodiment.

FIG. 7 is a flowchart 700 illustrating example operations for receiving an antenna signal by an electronic device according to an embodiment. The operations for receiving an antenna signal may include operations 701, 703, 705, 707, 709 and 707. The operations for receiving an antenna signal may be performed by an electronic device (e.g., the electronic device 101 of FIG. 1, at least one processor (e.g., the processor 120 of FIG. 1) of the electronic device, the electronic device 501 of FIG. 5, or the processor (e.g., the processor 520 of FIG. 5) of the electronic device). According to an embodiment, at least one of operations 701 to 707 may be omitted or changed in order or may add other operations.

Referring to FIG. 7, in operation 701, the electronic device may determine whether an external electronic device connects. According to an embodiment, if the resistance when an external electronic device connects to the connector (e.g., the connector 550 of FIG. 5) of the electronic device indicates an audio-purpose external electronic device (e.g., the audio-purpose external electronic device 210 of FIG. 2), the electronic device may determine that the audio-purpose external electronic device connects to the connector (e.g., the connector 550 of FIG. 5). According to an embodiment, if receiving a voltage via the VBUS pin of the connector when the external electronic device connects to the connector (e.g., the connector 550 of FIG. 5), the electronic device may determine that a charging-purpose external electronic device connects to the connector.

If the electronic device determines that an audio-purpose external electronic device (e.g., the audio-purpose external electronic device 210 of FIG. 2) connects to the connector (e.g., the connector 550 of FIG. 5) of the electronic device and determines to execute an application corresponding to the audio-purpose external electronic device in operation 703, the electronic device, in operation 705, may activate a communication circuit configured to receive a frequency modulation (FM) and/or a digital multimedia broadcasting (DMB) (e.g., the communication circuit 540 of FIG. 5) of the electronic device and connect at least two ground pins (e.g., A1 and B1 or A12 and B12 of FIGS. 6A and 6B) among the plurality of ground (GND) pins (e.g., the plurality of GND pins A1, A12, B1, and B12 of FIGS. 6A and 6B) included in the connector to the FM/DMB receiving unit.

In operation 707, the electronic device may receive the antenna signal, from audio-purpose external electronic device via at least one pin among at least two ground pins (e.g., A1 and B1 or A12 and B12 of FIGS. 6A and 6B), to the communication circuit (e.g., the communication circuit 540 of FIG. 5). According to an embodiment, the antenna signal received via at least one ground pin, contacting the antenna pin included in the connector of the audio-purpose external electronic device connected to the connector of the electronic device, among the at least two ground pins (e.g., A1 and B1 or A12 and B12 of FIGS. 6A and 6B) may be output to the communication circuit (e.g., the communication circuit 540 of FIG. 5). According to an embodiment, the electronic device may selectively connect at least two ground pins (e.g., A1 and B1 or A12 and B12 of FIGS. 6A and 6B) among the plurality of ground pins to the communication circuit (e.g., the communication circuit 540 of FIG. 5) using a switch (not shown) included in the electronic device.

Upon determining that an external electronic device (e.g., a charging-purpose external electronic device) other than the audio-purpose external electronic device (e.g., the audio-purpose external electronic device 210 of FIG. 2) connects to the connector (e.g., the connector 550 of FIG. 5) of the electronic device in operation 703, the electronic device may use the plurality of ground (GND) pins (e.g., the plurality of ground pins A1, A12, B1, and B12 of FIGS. 6A and 6B) included in the connector as ground pins as originally intended in operation 709. According to an embodiment, the electronic device may selectively connect at least two ground pins (e.g., A1 and B1 or A12 and B12 of FIGS. 6A and 6B) among the plurality of ground pins to the ground pin of the electronic device using a switch (not shown) included in the electronic device.

According to an example embodiment, a method of receiving an antenna signal by an electronic device (e.g., the electronic device 101 of FIG. 1, the electronic device 201 of FIG. 2, or the electronic device 501 of FIG. 5) comprises, when an audio-purpose external electronic device connects to a connector of the electronic device, and an application corresponding to the audio-purpose external electronic device runs, activating a communication circuit configured to receive a frequency modulation (FM) and/or a digital multimedia broadcasting (DMB) (e.g., the communication circuit 540 of FIG. 5) included in the electronic device to connect at least two ground pins (e.g., A1 and B1 or A12 and B12 of FIGS. 6A and 6B) among a plurality of ground pins (e.g., the plurality of ground pins A1, A12, B1, and B12 of FIGS. 6A and 6B) included in the connector to the communication circuit and receiving the antenna signal from the audio-purpose external electronic device (e.g., the audio-purpose external electronic device 210 of FIG. 2) via at least one ground pin among the at least two ground pins.

According to an example embodiment, the at least two ground pins among the plurality of ground pins may be pins positioned to be able to contact at least one antenna pin included in a connector of the audio-purpose external electronic device when the connector of the electronic device connects with the connector of the audio-purpose external electronic device.

According to an example embodiment, the at least one antenna pin included in the connector of the audio-purpose external electronic device may be at least one ground pin connected with an antenna signal line among a plurality of ground pins included in the connector of the audio-purpose external electronic device.

According to an example embodiment, connecting to the communication circuit may include determining whether an external electronic device connects to the connector, determining a kind of the external electronic device when the external electronic device connects to the connector, and when the kind of the external electronic device is the audio-purpose external electronic device, connecting the at least two ground pins among the plurality of ground pins to the FM/DMB receiving unit.

According to an example embodiment, the method may further comprise, unless the kind of the external electronic device is the audio-purpose external electronic device, using the plurality of ground pins for grounding purposes.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, etc. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element. As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an example embodiment of the disclosure, there is provided a non-transitory computer readable storage medium storing instructions configured to be executed by at least one processor to enable the processor to perform at least one operation that may include, when an audio-purpose external electronic device connects to a connector of the electronic device, and an application corresponding to the audio-purpose external electronic device runs, activating an communication circuit included in the electronic device to connect at least two ground pins among a plurality of ground pins included in the connector to the communication circuit and receiving the antenna signal from the audio-purpose external electronic device via at least one ground pin among the at least two ground pins.

As is apparent from the foregoing description, according to various example embodiments, the electronic device may make use of both audio functionality and antenna functionality via connection with an audio-purpose external electronic device with a USB type-C plug, only with the USB type-C receptacle, but without the need for an earjack (e.g., 3.5 phi) for connection of an analog earphone.

The disclosure has been illustrated and described with reference to various example embodiments. One of ordinary skill in the art will understand that the various example embodiments are intended to be illustrative, not limiting. It should be appreciated by one of ordinary skill in the art that various changes in form or detail may be made without departing from the true spirit and full scope of the disclosure, including the following claims.

What is claimed is:

1. An electronic device, comprising:
a connector;
a communication circuit configured to receive a frequency modulation (FM) and/or a digital multimedia broadcasting (DMB); and
a processor,
wherein the processor is configured to:
  determine whether an external electronic device is connected to the connector,
  based on the external electronic device being connected to the connector, determine a kind of the external electronic device,
  based on the kind of the external electronic device being an audio-purpose external electronic device, determine that at least two ground pins among a plurality of ground pins included in the connector are pins for antenna signal reception, and
  based on the kind of the external electronic device being a charging-purpose external electronic device, use the plurality of ground pins for grounding,
  wherein the at least two ground pins are positioned outermost among a plurality of pins in the connector.

2. The electronic device of claim 1, wherein at least two ground pins among the plurality of ground pins disposed at least two pins apart from a plurality of signal transmission/reception pins and/or a plurality of power supply pins among the plurality of pins included in the connector are configured to be used as pins for antenna signal reception.

3. The electronic device of claim 1, wherein at least two ground pins among the plurality of ground pins include at least one ground pin among a plurality of ground pins arranged at a top and at least one ground pin among a plurality of ground pins arranged at a bottom, among the plurality of pins of the connector.

4. The electronic device of claim 1, wherein at least two ground pins among the plurality of ground pins are connected with a ground pin of the electronic device via an inductor to configure the at least two ground pins to be used as pins for antenna signal reception and pins for grounding.

5. The electronic device of claim 1, wherein the processor further configured to, based on the audio-purpose external electronic device being connected to the connector, and an application corresponding to the audio-purpose external electronic device running, activate the communication circuit to connect the at least two ground pins among the plurality of ground pins included in the connector to the communication circuit, and receive an antenna signal from the audio-purpose external electronic device via the at least two ground pins.

6. The electronic device of claim 1, wherein the connector includes a universal serial bus (USB) type-C receptacle.

7. The electronic device of claim 1, the audio-purpose external electronic device, comprising:
a connector;
an audio signal unit including an audio codec; and
an antenna unit including an antenna pad connected to an antenna signal line,
wherein at least two ground pins among a plurality of ground pins included in the connector are connected to the antenna pad of the antenna unit to configure the at least two ground pins to be used as antenna pins, and
wherein the at least two ground pins are positioned outermost among a plurality of pins in the connector.

8. The audio-purpose external electronic device of claim 7, wherein the audio codec of the audio signal unit is connected to one of a plurality of power supply pins included in the connector.

9. The audio-purpose external electronic device of claim 7, wherein the audio codec of the audio signal unit is connected with two of a plurality of signal transmission/reception pins included in the connector.

10. The audio-purpose external electronic device of claim 7, wherein the audio signal unit is separated from a conductive area of the antenna unit.

11. The audio-purpose external electronic device of claim 7, wherein the antenna signal line is included in a cable of the audio-purpose external electronic device.

12. The audio-purpose external electronic device of claim 7, wherein the connector includes a USB type-C plug.

13. A method of receiving an antenna signal by an electronic device, the method comprising:
determining whether an external electronic device is connected to a connector of the electronic device,
based on the external electronic device being connected to the connector, determining a kind of the external electronic device,
based on the kind of the external electronic device being a audio-purpose external electronic device, determining that at least two ground pins among a plurality of ground pins included in the connector are pins for antenna signal reception, and
based on the kind of the external electronic device being a charging-purpose external electronic device, using the plurality of ground pins for grounding, wherein the at least two ground pins are positioned outermost among a plurality of pins in the connector.

14. The method of claim 13, wherein at least two ground pins among the plurality of ground pins are pins positioned to contact at least two antenna pins included in a connector of the audio-purpose external electronic device based on the connector of the electronic device being connected with the connector of the audio-purpose external electronic device.

15. The method of claim 14, wherein at least two antenna pins included in the connector of the audio-purpose external electronic device are at least two ground pins connected with an antenna signal line among a plurality of ground pins included in the connector of the audio-purpose external electronic device.

* * * * *